United States Patent
Suzuki et al.

(10) Patent No.: US 7,974,330 B2
(45) Date of Patent: Jul. 5, 2011

(54) MULTI-CARRIER CODE DIVIDING MULTIPLEX TRANSFER SYSTEM AND METHOD, AND RECEIVING DEVICE

(75) Inventors: Toshinori Suzuki, Fujimino (JP); Noriaki Miyazaki, Fujimino (JP)

(73) Assignee: KDDI Corporation, Tokyo (JP)

( * ) Notice: Subject to any disclaimer, the term of this patent is extended or adjusted under 35 U.S.C. 154(b) by 687 days.

(21) Appl. No.: 11/992,525

(22) PCT Filed: Sep. 28, 2006

(86) PCT No.: PCT/JP2006/319285
§ 371 (c)(1),
(2), (4) Date: Mar. 25, 2008

(87) PCT Pub. No.: WO2007/037320
PCT Pub. Date: Apr. 5, 2007

(65) Prior Publication Data
US 2010/0142589 A1 Jun. 10, 2010

(30) Foreign Application Priority Data
Sep. 28, 2005 (JP) ................................. 2005-281550

(51) Int. Cl.
*H04B 1/707* (2011.01)
(52) U.S. Cl. ...................................................... 375/141
(58) Field of Classification Search .................. 375/141, 375/147, 260, 340; 370/210, 335, 342
See application file for complete search history.

(56) References Cited

U.S. PATENT DOCUMENTS

| 6,005,887 | A | 12/1999 | Bottomley et al. | |
| 7,564,906 | B2 * | 7/2009 | Wang et al. | 375/260 |
| 2002/0191710 | A1 * | 12/2002 | Jeckeln et al. | 375/296 |
| 2004/0208232 | A1 * | 10/2004 | Sudo | 375/146 |
| 2006/0018276 | A1 * | 1/2006 | Kim et al. | 370/329 |

FOREIGN PATENT DOCUMENTS

| JP | 2001-504655 | 4/2001 |
| JP | 2006-514803 | 5/2006 |
| WO | WO-2004/082200 A1 | 9/2004 |

OTHER PUBLICATIONS

Miyazaki et al., "*A Study on Forward Link Capacity in MC-CD-MA Cellular System with MMSEC Receiver*", IEICE Trans. Commun, Feb. 2005 (E88)(2) 585-593.

KDDI, "Enhancement of Distributed Mode for Maximizing Frequency Diversity," R1-051261, United Stats, 3GPP TSG RAN WG1#42 bis, Oct. 10, 2005, URL, http://www.3gpp.org/ftp/tsg_ran/WG1_RL1/TSGR1_42bis/Docs/R1-051261zip.

* cited by examiner

*Primary Examiner* — Khanh C Tran
(74) *Attorney, Agent, or Firm* — Edwards Angell Palmer & Dodge LLP; David G. Conlin; David A. Tucker

(57) ABSTRACT

The multi-carrier code dividing multiplex transfer system of the present invention includes a direct demodulator that discriminates transmitted signals according to a receiving signal point composed of a combination of receiving values in a spread state of sub-carriers in a range where one modulated symbol is spread, and according to reference signal composing values that can be taken by the combination of the receiving values in the spread state of the sub-carriers. As a result, it is possible to prevent from affects of inter-code interference, and improve receiving characteristics as well.

12 Claims, 15 Drawing Sheets

MULTI-CARRIER CODE DIVIDING MULTIPLEX TRANSFER SYSTEM AND METHOD, AND RECEIVING DEVICE

TECHNICAL FIELD

The present invention relates to a multi-carrier code dividing multiplex transfer system, a method, and a receiving device for the same.

Priority is claimed on Japanese Patent Application No. 2005-281550, filed on Sep. 28, 2005, the content of which is incorporated herein by reference.

BACKGROUND ART

One typical system of multi-carrier transfer systems that use a plurality of sub carriers to provide multiplex transfer is conventionally known as a multi-carrier-code-division multiplexing (MC-CDM) system. The MC-CDM is supposed to have features that frequency diversity effects can be obtained by means of using orthogonal codes for providing frequency multiplication of the signals spread in frequency direction through a plurality of sub-carriers, resulting in better receiving characteristics of the modulated symbols provided. A problem arises, however, that the receiving characteristics becomes deteriorated because of inter-codes interference that will occur if the orthogonal nature between the codes is damaged by frequency selectivity of a radio channel.

FIG. 13 is a block diagram that illustrates a configuration of a conventional multi-carrier-code-divided multiplexing system. FIG. 13 shows a transmitting device 100 including a modulator (MOD) 101 that modulates transmitting data and outputs modulated symbols. Description is given based on the symbols as b [n] as follows: However, n is a mark showing time, giving a modulated symbol number. As an example of a modulating system, a quadrature phase shift keying quadriphase shift keying (QPSK) system is used herein. A modulating symbol b [n] can obtain a signal point alignment on an IQ surface (that is a flat surface structuring with values that channel I (real numbers) and channel Q (imaginary numbers) can obtain), as illustrated in FIG. 14. FIG. 14 indicates four standard signal points that the modulating symbol b [n] can obtain.

A spreading and multiplexing unit 102 spreads modulating symbols in code, and multiplexes these modulated symbols. The simplest combination, duple spread (spread ratio is 2, and one modulating symbol is spread into two sub-carriers) and duple multiplex (multiplex number is 2, mapping two modulating symbols to one sub-carrier) is used herein. As a spread code, a Walsh code is used. A Walsh code is generated from the Hadamard matrix. The Hadamard matrix is a diametric alignment in which rows and columns are at right angles of each other with +1 and −1 as elements. The Walsh matrix can be obtained by realigning an ascending order in the number of times that a code is replaced with a column in the Hadamard matrix. The spread multiplex conversion matrix $T_2$ supporting the duple spread and the duple multiplex is expressed as formula (1).

$$T_2 = \begin{pmatrix} 1 & 1 \\ 1 & -1 \end{pmatrix} \quad (1)$$

A spreading and multiplexing unit 102 conducts duple spread and duple multiplex according to formula (2). As a result, two modulating symbols b [2n−1] and b[2n] are outputted as two chip signals c1 [n] and c2[n].

$$\begin{pmatrix} c_1[n] \\ c_2[n] \end{pmatrix} = T_2 \begin{pmatrix} b[2n-1] \\ b[2n] \end{pmatrix} = \begin{pmatrix} b[2n-1] + b[2n] \\ b[2n-1] - b[2n] \end{pmatrix} \quad (2)$$

A serial/parallel conversion unit (S/P) 103 converts two-system chip signal c1 [n] and c2 [n] as respective serial signal inputs into parallel signals. The parallel signal numbers are based on a ratio of sub-carrier numbers used for data transfer with a spread rate. In case the sub-carrier numbers are 512, for example, a spread rate is 2 and the parallel numbers are 256, which is given by a formula 512 divided by 2.

An Inverse Fast Fourier Transform (IFFT) 104 provides a paralleled chip signal $h_k$ with Inverse Fast Fourier Transform processing, and converts it as the signal in a frequency region into a signal in a time region. The chip signals c1 [n] and c2 [n] of which n are the same are herein given a distance as sufficient as possible on the frequency region. By this, higher frequency diversity effects can be obtained.

A parallel/serial conversion unit (P/S) converts a signal in a time region after output of IFFT 104 into a serial signal. A guard interval insertion unit (+GI) 106 adds a guard interval to its serial signal. A guard interval is a signal that maintains orthogonal nature between sub-carriers even at a receiving side. A signal after the addition of the guard interval is sent by radio transmission together with a pilot signal (not illustrated herein). A pilot signal is used for estimating a channel at a receiving side.

In a receiving device 200, illustrated in FIG. 13, a guard interval removing unit (−GI) 201 removes guard intervals from the signals received by radio transmission. An S/P 202 converts signals after removing guard intervals into parallel signals. A Fast Fourier Transform (FFT) 203 provides the paralleled chip signals with Inverse Fast Fourier Transform processing, and converts them from the signals in a frequency region into sub-carrier signals $H_k$ in a time region. The sub-carrier signal $H_k$ hereof includes changes of amplitude and a phase received in a channel.

A channel estimation and MMSE correction unit 204 measures a state of channels according to receiving characteristics of pilot signals. The unit also measures a noise power density in a frequency band. Then the channel estimation and MMSE correction unit 204 conducts an equivalent processing using Minimum Means Square Errors (MMSE) according to the channel state and the noise power density. A sub-carrier signal $H_k'$ output from the channel estimation and MMSE correction unit 204 is expressed in formula (3).

$$H_k' = \frac{H_k \cdot A_k^*}{|A_k|^2 + N_0} \quad (3)$$

However, $H_k$ is the $K^{th}$ order of the sub-carrier signal that is input, and $H_k'$ is the $K^{th}$ order of the sub-carrier that is output, $A_k$ is a channel stat of the sub-carrier number K and $N_o$ is a noise power density.

The P/S 205 converts the sub-carrier signal $H_k$ into a serial signal, and outputs the signal as a combination of (c1' [n] and c2' [n]) the chip signal duple spread.

An inverse spreading unit 206 obtains a correlation of a chip signal and a spread code, and then restores the modulated symbol that was spread. More specifically, an operation as expressed formula (4) is arranged.

$$\begin{pmatrix} b'[2n-1] \\ b'[2n] \end{pmatrix} = T_2^{-1} \begin{pmatrix} c'[n] \\ c'_2[n] \end{pmatrix} = \frac{1}{2}\begin{pmatrix} 1 & 1 \\ 1 & -1 \end{pmatrix}\begin{pmatrix} c'[n] \\ c'_2[n] \end{pmatrix} \quad (4)$$

The modulated symbol spread in a chip signal c1 [n] that supports the sub-carrier signal $H_k$ in the number K under $K/2 \geq k$ in chase where the sub-carrier numbers are K is also spread into a sub-carrier signal $H_{k+K/2}$, that also supports the chip signal C2 [n]. When background noises mixed into these two sub-carrier signals $H_k$ and $H_{k+k/2}$ are respectively $n_k$, and $n_{k+k/2}$, a formula (5) is satisfied.

$$H_k = A_k c_1[n] + n_k, \quad (5)$$
$$H_{k+K/2} = A_{k+K/2} c_2[n] + n_{k+K/2}$$
$$c'_1[n] = H'_k = \frac{|A_k|^2 c_1[n] + A_k^* n_k}{|A_k|^2 + N_0},$$
$$c'_2[n] = H'_{k+K/2} = \frac{|A_{k+K/2}|^2 c_2[n] + A_{k+K/2}^* n_{k+K/2}}{|A_{k+K/2}|^2 + N_0}$$

When the above formulas (3) and (5) are assigned to the formula (4), demodulated symbols after inverse spread can be obtained. For example, b' [n−1] is expressed in formula (6).

$$b'[n-1] = \left( \frac{|A_k|^2}{|A_k|^2 + N_0} + \frac{|A_{k+K/2}|^2}{|A_{k+K/2}|^2 + N_0} \right) b[n-1] + \quad (6)$$
$$\left( \frac{|A_k|^2}{|A_k|^2 + N_0} - \frac{|A_{k+K/2}|^2}{|A_{k+K/2}|^2 + N_0} \right) b[n] +$$
$$\left( \frac{A_k^* n_k}{|A_k|^2 + N_0} + \frac{A_{k+K/2}^* n_{k+K/2}}{|A_{k+K/2}|^2 + N_0} \right)$$

In the above formula (6), the first section of the right-hand member is a section related to an intended modulated symbol b [n−1], the second section is a section related to an interfering modulated symbol b [n] (the section related to interference noises), and the third section is a section related to background noises. Supposing relations of the formula (7) can be satisfied herein, the background noises are only mixed as noise components without mutual interference of the modulated symbols b [n−1] and b [n].

$$|A_k| = |A_{k+K/2}| \quad (7)$$

Although relations of the above formula (7) are generally not available, electric power of an average noise (which is a combination of background noises and interference noises) is ensured to be minimized according to an operation based on the above formula (3) even in such a case. As a result, signals supporting the modulated symbols b [n−1] and b [n] are input into a demodulator (DEM) 207 as a signal point on an IQ flat surface. The modulator 207 decides that it is the receiving data that is the standard single point (refer to FIG. 14) of the modulated symbol closest to the receiving signal point. The receiving signal point, however, includes interference components mixed at the time of inverse spread, as expressed in the above formula (6). The receiving accuracy, thus, becomes deteriorated in the modulator 207. (See: N. Miyazaki and T. Suzuki, "A Study on Forward Link Capacity in MC-CDMA Cellular System with MMSEC Receiver," IEICE Trans. Commun., Vol. E88-B, No. 2, pp. 585-593, February 2005.)

As described above, a conventional MC-CDM system cannot avoid deterioration of receiving characteristics affected by inter-code interference caused by frequency selectivity of a radio channel, even in case where an MMSE-based equalization technology, in which the characteristics are believed to be most excellent, is applied.

DISCLOSURE OF INVENTION

In light of current problems as stated above, the present invention is aimed to provide a multi-carrier code dividing multiplex transfer system capable of preventing affects of the inter-code interference and promoting to improve the receiving characteristics, and a method and a receiving unit for the same.

In order to solve the above problems, the multi-carrier code dividing multiplex transfer system of the present invention is equipped with a demodulator for discriminating transmitted signals according to a receiving signal point composed of a combination of receiving values in a spread state of sub-carriers in a range where one modulated symbol is spread, and a reference signal composing values that can be taken by the combination of the receiving values in the spread state, in the multi-carrier code dividing multiplex transfer system that code-spreads modulated symbols in a frequency direction, frequency-multiplexes and transfers them in a plurality of the sub-carriers.

The multi-carrier code dividing multiplex transfer system of the present invention includes the demodulator for providing the decision according to probability of a specific value that the modulated symbol could take as well.

The multi-carrier code dividing multiplex transfer system of the present invention is equipped with a decoder for applying error correction codes, decoding the error correction codes from the result of decisions from the demodulator, and giving feedback correctness of decoding results obtained in the decoding process as the probability.

The multi-carrier code dividing multiplex transfer system of the present invention uses a rotating orthogonal code as a spread code; the rotating orthogonal code is composed of a trigonometrical function that includes adjustment parameters as arguments.

The method for the multi-carrier code dividing multiplex transfer system of the present invention in which code-spreads modulated symbols in a frequency direction, frequency-multiplexes and transfers them, includes a demodulating step for discriminating transmitted signals according to a receiving signal point composed of a combination of receiving values in a spread state of sub-carriers in a range where one modulated symbol is spread, and a reference signal point that can be taken by the combination of the receiving values in the spread state.

The receiving device of the present invention is equipped with a demodulator for discriminating transmitted signals according to a receiving signal point composed of a combination of receiving values in a spread state of sub-carriers in a range where one modulated symbol is spread, and a reference signal composing values that can be taken by the combination of the receiving values in the spread state, and in the receiving device that receives transferred signals of which modulated symbols are code-spread and frequency-multiplexed by a plurality of sub-carriers modulated symbols in a frequency direction.

The multi-carrier code dividing multiplex transfer system of the present invention may include the demodulator equipped with: a reference signal point preparation unit for preparing a coordinate of reference signals according to a type of modulating method, a type of spread multiplexing method and information on receiving stress of the sub-carrier signals; a receiving signal point preparation unit for preparing a coordinate of the receiving signal from the combination of the receiving values in the spread state; and a likelihood calculation unit for calculating the likelihood according to the coordinate of the reference signal point and the coordinate of the receiving signal point.

The multi-carrier code dividing multiplex transfer system of the present invention may separate the coordinate of the reference signal point, the coordinate of the receiving signal point and the likelihood into real numbers and imaginary numbers, and then respectively calculates them.

In the method for a multi-carrier code dividing multiplex transfer system of the present invention, the step of demodulating may further include the steps of: preparing a coordinate of reference signals according to a type of modulating method, a type of spread multiplexing method and information on receiving stress of the sub-carrier signals; preparing a coordinate of the receiving signal from the combination of the receiving values in the spread state; and calculating the likelihood according to the coordinate of the reference signal point and the coordinate of the receiving signal point.

In the method for the multi-carrier code dividing multiplex transfer system of the present invention, may include the step of respectively calculating the coordinate of the reference signal point, the coordinate of the receiving signal point and the likelihood with separating into real numbers and imaginary numbers.

In the receiving device of the present invention, the demodulator may include: a reference signal point preparation unit for preparing a coordinate of reference signals according to a type of modulating method, a type of spread multiplexing method and information on receiving stress of the sub-carrier signals; a receiving signal point preparation unit for preparing a coordinate of the receiving signal from the combination of the receiving values in the spread state; and a likelihood calculation unit for calculating the likelihood according to the coordinate of the reference signal point and the coordinate of the receiving signal point.

In the receiving device of the present invention, the coordinate of the reference signal point, the coordinate of the receiving signal point and the likelihood are separated into real numbers and imaginary numbers, and then they are respectively calculated.

Since the present invention can demodulate the signals in a spread state as it is without inverse spread, demodulation can be promoted without affects of the inter-code interference. As a result, demodulating accuracy can be improved and receiving characteristics can also be improved.

BEST MODE FOR CARRYING OUT THE INVENTION

Hereinafter, the embodiments of the present invention will be described with reference to accompanying drawings.

First Embodiment

Figure 1:
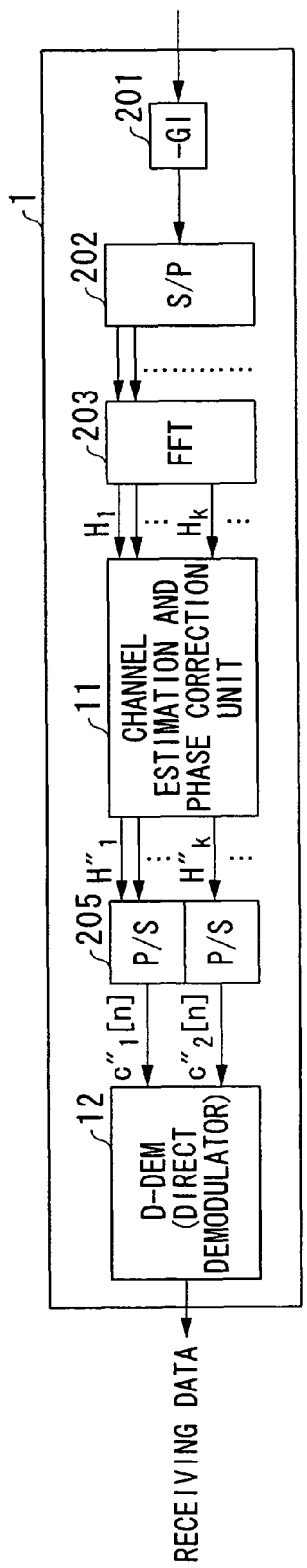
FIG. 1 is a block diagram that illustrates a configuration of the receiving device 1 of the multi-carrier-code-divided multiplexing system according to the first embodiment of the present invention.

FIG. 1 is a block diagram that illustrates a configuration of the receiving device 1 of the multi-carrier-code-divided multiplexing system according to the first embodiment of the present invention. FIG. 1 shows units corresponding to each of those in a conventional receiving device 200 (refer to FIG. 13) with the same reference numerals denoted, and their descriptions are omitted. It should be noted that the multi-carrier code dividing multiplex transfer system of the present embodiment is similar to the conventional transmitting device 100 (refer to FIG. 13), using QPSK system as its modulating system with spread ratio 2, and the multiplexing numbers are 2.

As FIG. 1 illustrates, a receiving device 1 includes a channel estimation and phase correction unit 11 for measuring a state of channels according to receiving characteristics of pilot signals. The device corrects the amount of phase change received by the channel every sub-carrier. As a result, a sub-carrier signal $H_k''$ (a signal supporting the sub-carrier in the $K^{th}$ order) becomes a signal with a background noise $n_k$ further added to the signal that the amplitude value $a_k$ (real number) in the channel multiplied by the sub-carrier signal $h_k$ in the $k^{th}$ order at the time of transmission, and it is expressed in a formula (8).

$$H_k''=a_k h_k+n_k \quad (8)$$

The sub-carrier signal, $H_k''$ is converted into a serial signal by the P/S 205, and output as a combination (c1'' [n] and c2'' [n]) of the chip signal duple spread.

A direct demodulator (D-DEM) 12 directly demodulates from the combination (c1'' [n] and c2'' [n]) of the chip signal duple spread. In other words, the direct demodulator obtains receiving data without applying inverse spread. The direct demodulating process is described by referring to FIGS. 2 and 3.

Figure 2:
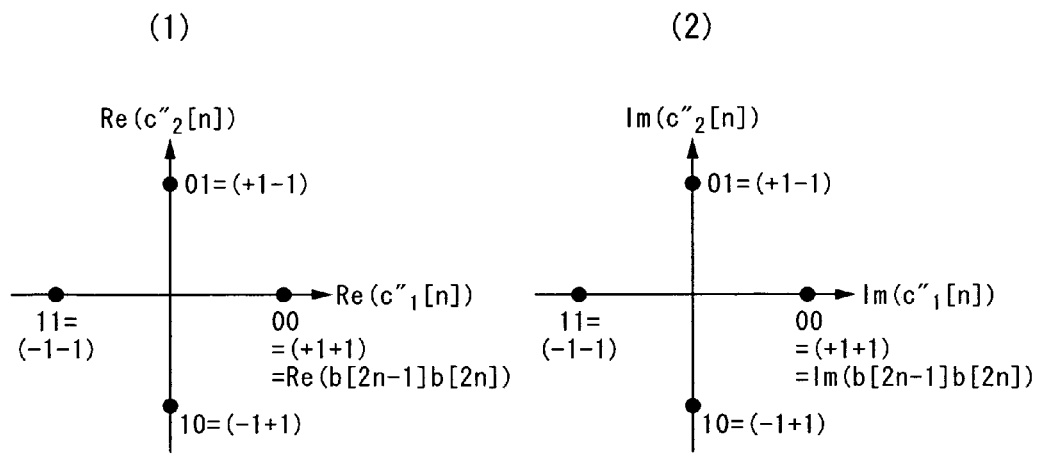
FIG. 2 is a complex space coordinate diagram that illustrates reference signal points of the same embodiment.

FIG. 2 is a complex space coordinate diagram showing a reference signal point of the present embodiment, while FIG. 2 (1) shows a real number space and FIG. 2 (2) shows an imaginary number space.

FIG. 2 shows the values that the combination of c1'' [n] and 2'' [n] can take (reference signal points) as separated into a real number supporting channel I (FIG. 2 (1)), and an imaginary number supporting channel Q (FIG. 2 (2)). In FIG. 2, Re (z) denotes the real number of complex number z (channel I component) while Im (z) denotes the imaginary number of complex number z (channel Q component).

Since the spread ratio in the present embodiment is 2, the combination of c1'' [n] and c2'' [n] is a combination of receiving values in a spread state of the sub-carriers within the range where one modulated symbol is spread. A value (reference signal point) that its combination of c1'' [n] and c2'' [n] can take is shown in the above formula (2). More specifically, the real number (channel I component) is expressed as follows:

In case of Re $(c1''\ [n]\ c2''\ [n])$="00", Re $(b\ [2n-1]\ b\ [2n])$= "+1+1",

In case of Re $(c1''\ [n]\ c2''\ [n])$="01", Re $(b\ [2n-1]\ b[2n])$= "+1-1",

In case of Re $(c1''\ [n]\ c2''\ [n])$="10", Re $(b\ [2n-1]\ b[2n])$= "-1+1" and In case of Re $(c1''\ [n]\ c2''\ [n])$="11", Re $(b\ [2n-1]\ b[2n])$= "-1-1".

The imaginary number (channel Q component) is expressed as follows:

In case of Im $(c1''\ [n]\ c2''\ [n])$="00", Im $(b\ [2n-1]\ b[2n])$= "+1+1",

In case of Im $(c1''\ [n]\ c2''\ [n])$="01", Im $(b\ [2n-1]\ b[2n])$= "+1-1",

In case of Im $(c1''\ [n]\ c2''\ [n])$="10", Im $(b\ [2n-1]\ b[2n])$= "-1+1" and In case of Im $(c1''\ [n]\ c2''\ [n])$="11", Im $(b\ [2n-1]\ b[2n])$= "-1-1".

The receiving device of the present invention discriminates transmitted signals according to a receiving signal point composed of a combination of receiving values in a spread state of sub-carriers in a range where one modulated symbol is spread, and a reference signal composing values that can be taken by the combination of the receiving values in the spread state of the sub-carriers.

Figure 3:
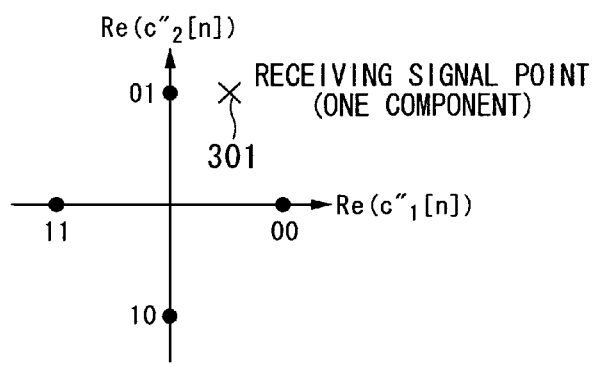
FIG. 3 is an explanatory diagram that explains direct demodulating processings of the same embodiment.

More specifically, a receiving signal point is aligned to a complex space coordinate system indicating a reference signal point of the above FIG. 2. Then, the reference signal point closest to the position of the receiving signal point is output as receiving data. For example, FIG. 3 shows one example of a receiving signal point (in only real number). The example in FIG. 3 shows a combined value (receiving signal point 301) of each real number (channel I component) in c1'' [n] and c2'' [n]. Its value 301 is in the position closest to "01" out of four reference signal points "00", "01", "10" and "11". The receiving data (real number) is accordingly expressed as Re (b [2n-1])=+1, Re (b [2n])=-1.

According to the aforementioned embodiment, MC-CDM system demodulation can process demodulation in a spread state as it is without inverse spread applied. Therefore, no interference components are mixed while it conventionally occurs at the time of inverse spread, resulting in no inter-code interference affected at the time of demodulating the present embodiment. As a result, demodulating accuracy can be improved and receiving characteristics improves.

Second Embodiment

Figure 4:
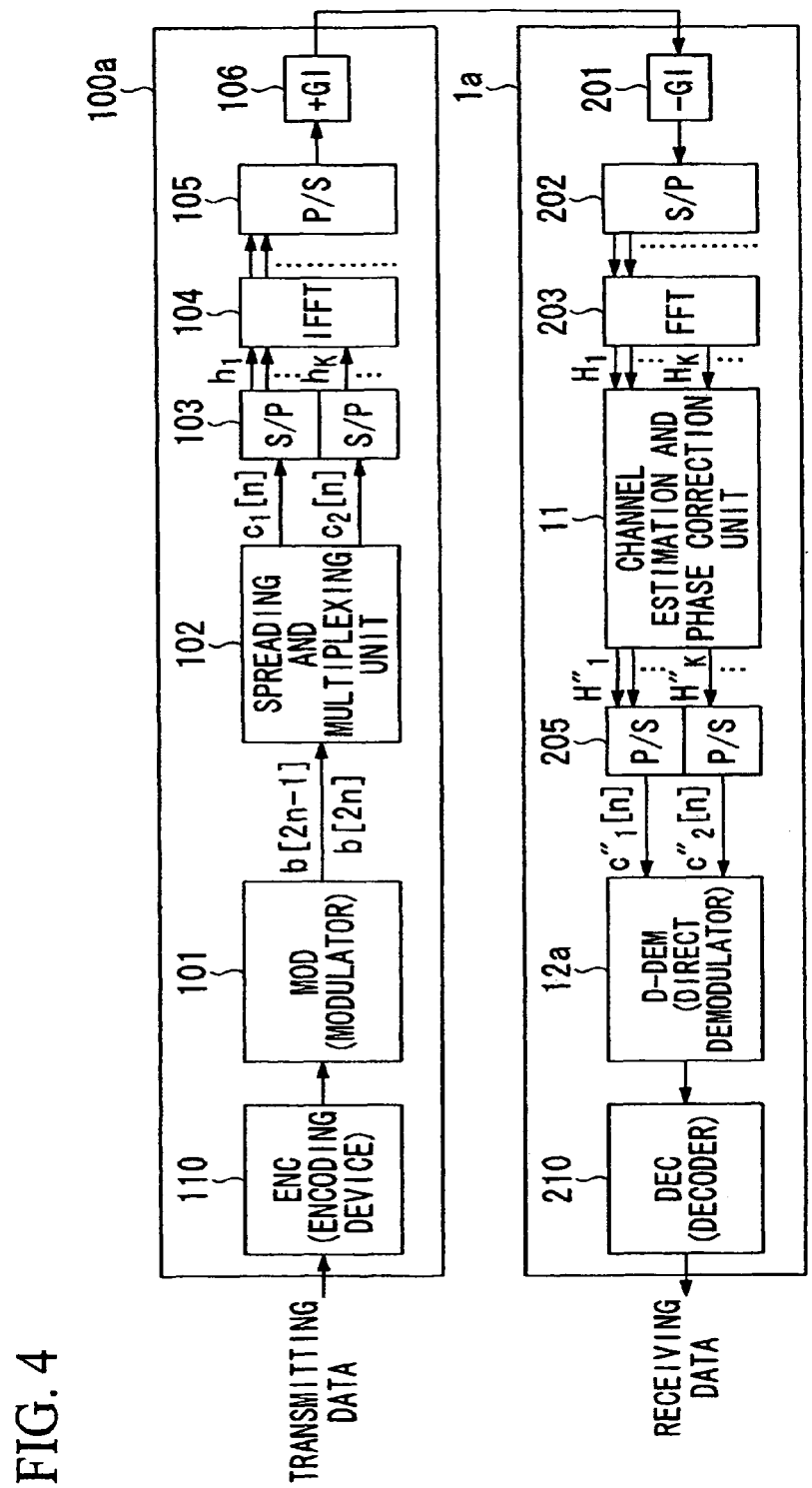
FIG. 4 is a block diagram that illustrates a configuration of a multi-carrier-code-divided multiplexing system according to the second embodiment of the present invention.

FIG. 4 is a block diagram that illustrates a configuration of a multi-carrier-code-divided multiplexing system according to the second embodiment of the present invention. The second embodiment is a deformation example of the above first embodiment, with error correction codes further applied.

Figure 13:
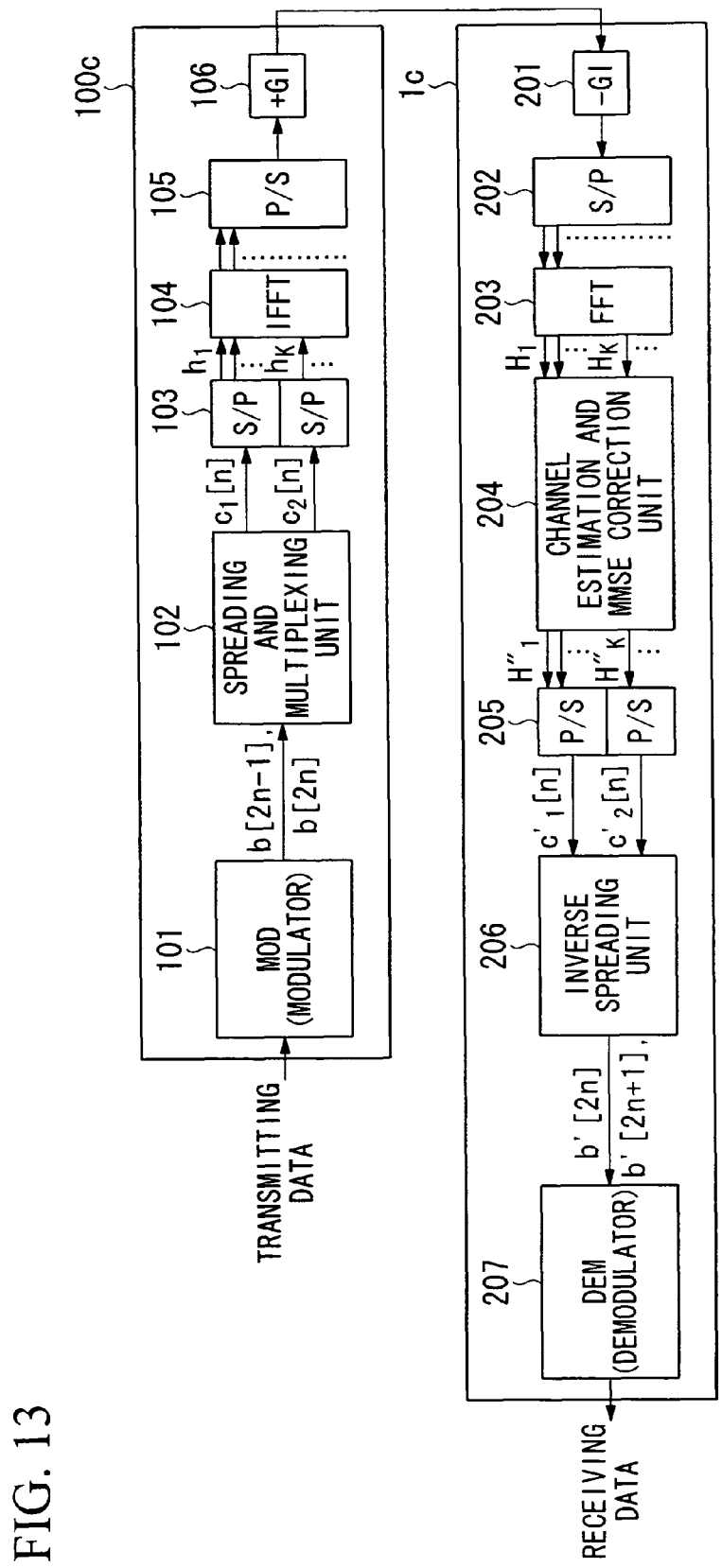
FIG. 13 is a block diagram that illustrates a configuration of a conventional multi-carrier-code-divided multiplexing system.
Figure 14:
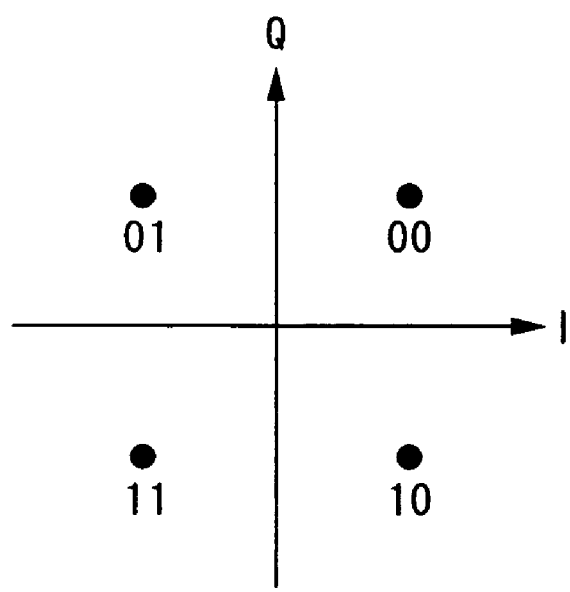
FIG. 14 is a diagram that illustrates a standard signal point of the modulated symbols for the QPSK system.

A transmitting device 100*a*, as illustrated in FIG. 4, includes an encoding device (ENC) mounted while another configuration is similar to that of a transmitting device 100, as illustrated in FIG. 13. A transmitting device 100*a* includes an encoding device 110 that adds error correction codes to the transmitting data. Its encoding data is input to a modulator 101 from the encoding device 110. Further processings are similar to those of the transmitting device, as illustrated in FIG. 13.

A receiving device 1*a*, as illustrated in FIG. 4, includes a decoder (DEC) 210 mounted. A direct demodulator 12*a* changes the processing method for a decoder 210 from that for the direct demodulator 12 in the above FIG. 1. Other configurations are similar to those of the receiving device, as illustrated in FIG. 1.

A decoder 210 conducts error correction processing according to the signals demodulated by the direct demodulator 12*a*, and outputs receiving data. The direct demodulator 12*a* outputs soft-decision input signals used for its error correction processing (likelihood per bit). Operation of its direct demodulator 12*a* is described with an example of the above FIG. 3.

A receiving signal point 301, as illustrated in FIG. 3, is a receiving signal point supporting two bits of Re (b [2n-1]) and Re (b [2n]). When only Re 8*b* [2n-1]) is concerned herein, its likelihood p is expressed in a formula (9).

$$p(x=0) = \exp\left(-\frac{d_{00}^2}{2\sigma^2}\right)p_a(y=0) + \exp\left(-\frac{d_{01}^2}{2\sigma^2}\right)p_a(y=1) \quad (9)$$

$$p(x=1) = \exp\left(-\frac{d_{10}^2}{2\sigma^2}\right)p_a(y=0) + \exp\left(-\frac{d_{11}^2}{2\sigma^2}\right)p_a(y=1)$$

However, x=Re (b [2n-1]), y=Re (b [2n]), and $d_{xy}^2$ expresses a square distance between a receiving signal point and a reference signal point (xy), and $\sigma^2$ expresses noise power per sub-carrier. Furthermore, $p_a(y=0)$ is a probability that y becomes 0 as a prior probability cleared in advance. The prior probability expresses probability that the modulated symbol can take a specific value.

The direct demodulator 12*a* calculates livelihood p according to the above formula (9). In case, no prior information is available on y, the likelihood p of x is calculated according to $p_a(y=0)=p_a(y=1)=\frac{1}{2}$. Max-log approximation may be also used for calculating livelihood p. Particularly when a decoder 210 proceeds decoding processing based on Max-log-MAP, it is not necessary to obtain noise power since the processing is not dependent on σ, so that calculation processing can be simplified.

The aforementioned second embodiment can also be applied to a system using error correction codes. The accuracy of demodulation can be expected to improve because the modulator symbol can conduct a decoding with probability integration according to prior probability that can take a specific value.

Specific implementation examples of the aforementioned second embodiment hereof are described as follows:

First, implementation examples of applying turbo codes are described by reference to FIGS. 5 and 6.

Figure 5:
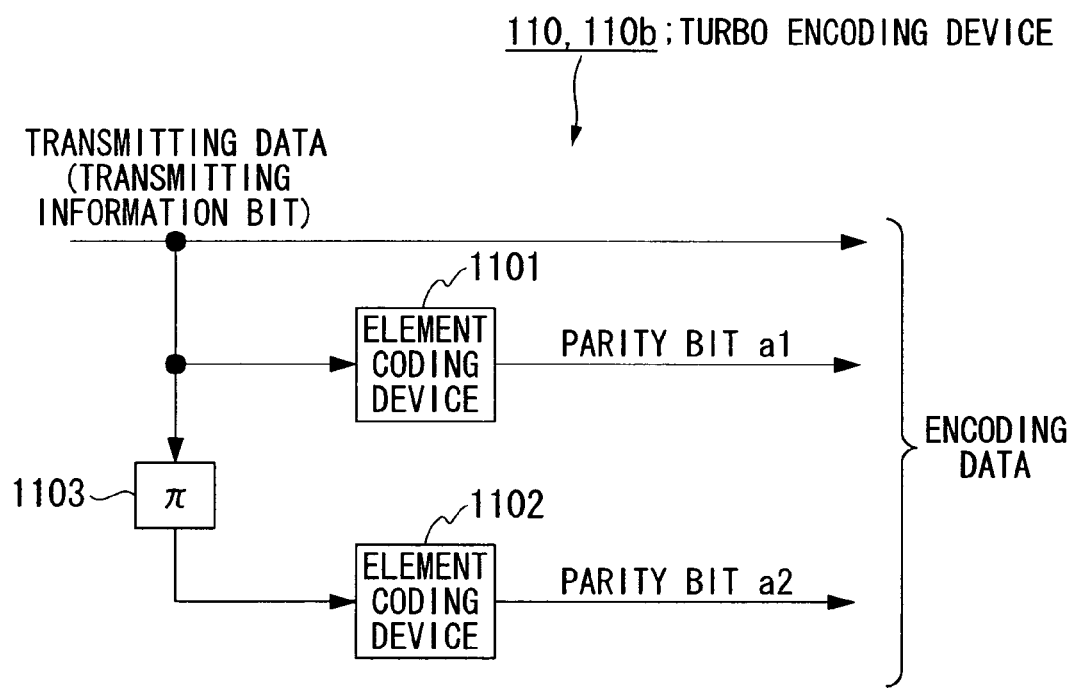
FIG. 5 is a block diagram that illustrates a configuration of a turbo encoding device 110 as an encoding device, as illustrated in FIG. 4.

FIG. 5 is a block diagram that illustrates a configuration of a turbo encoding device 110 as an encoding device, as illustrated in FIG. 4.

The configuration illustrated in FIG. 5 is well known. The turbo encoding device 110 is equipped with two element coding devices 1101 and 1102 that encode with two element codes. In FIG. 5, the element coding device 1101 generates a parity bit a1 from transmitting information. An interleaver 1103 complicates the orders of input transmitting information bits. The element coding device 1102 generates a parity bit a2 from the transmitting information after being output from the interleaver 1103. The parity bits a1 and a2 are therefore generated from the same transmitting information bit. However, the order of inputting the transmitting information bits is complicated between the element coding devices 1101 and 1102.

The turbo encoding device 110 outputs a total of three bits, such as the input transmitting information bit and parity bits a1 and a2, as the encoding data.

Figure 6:
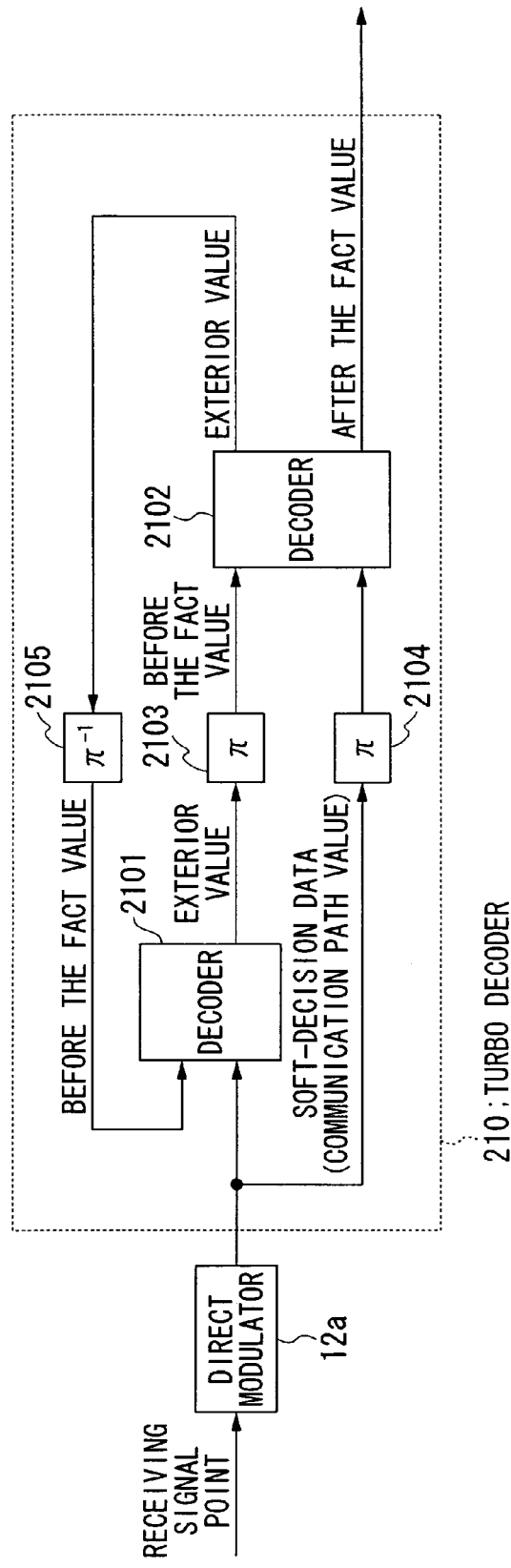
FIG. 6 is a block diagram that illustrates a configuration of a turbo decoder 210 as a decoder, as illustrated in FIG. 4.

FIG. 6 is a block diagram that illustrates a configuration of a turbo decoder 210 as a decoder, as illustrated in FIG. 4.

In FIG. 6, the direct demodulator 12a outputs soft-decision data of the modulated symbol per bit as soft-decision data. The soft-decision data is inputted in the turbo decoder 210 as a communication path value.

The turbo decoder 210, as illustrated in FIG. 6, configured as supporting the turbo encoding device 110, as illustrated in FIG. 5, is equipped with a decoder 2101 supporting an element coding device 1101 and a decoder 2102 supporting an element coding device 1102. It should be noted that the configuration of the turbo decoder 210 in FIG. 6 is well known.

In the turbo decoder 210, the decoder 2101 first inputs both communication path values of the transmitting information bit and the parity bit a1. In case where the decoder 2101 first conducts decoding processing, a prior value of the transmitting information bit is set as [½] (which is 0 in logarithmic likelihood). As a result, an exterior value of the transmitting information bit and an after-the-fact value are calculated. However, the exterior value is only used for the next processing at this stage.

The exterior value after output from the decoder 2101 is complicated in the interleaver 2103, and then the value is inputted in the decoder 2102 as a before-the-fact value. Both communication path values of the transmitting information bit and the parity bit a2 are inputted to the decoder 2102. A communication path value of the transmitting information bit hereof is inputted in the decoder 2102 after it is complicated in the interleaver 2104, same as the exterior value after outputted from the decoder 2101. The decoder 2102 outputs exterior values of the transmitting information bits and the after-the-fact values as a result of decoding processing. The after-the-fact values after being outputted from the decoder 2102 are bit-discriminated and outputted as receiving data (receiving information bits).

The exterior value after outputted from the decoder 2102 is inverse-complicated in an inverse interleaver 2105, and then the value is inputted in the decoder 2101 as a before-the-fact value. Calculation processing is accordingly implemented from the decoder 2101 again.

Although the aforementioned embodiment includes the turbo encoding device 110 that outputs parity bits as they are, various changes can be provided, such as puncturing the parity bits or applying channel interleaving to the transmitting information bits and the parity bits, so as to adjust the configuration of the turbo encoding device 210 to those changes.

Figure 7:
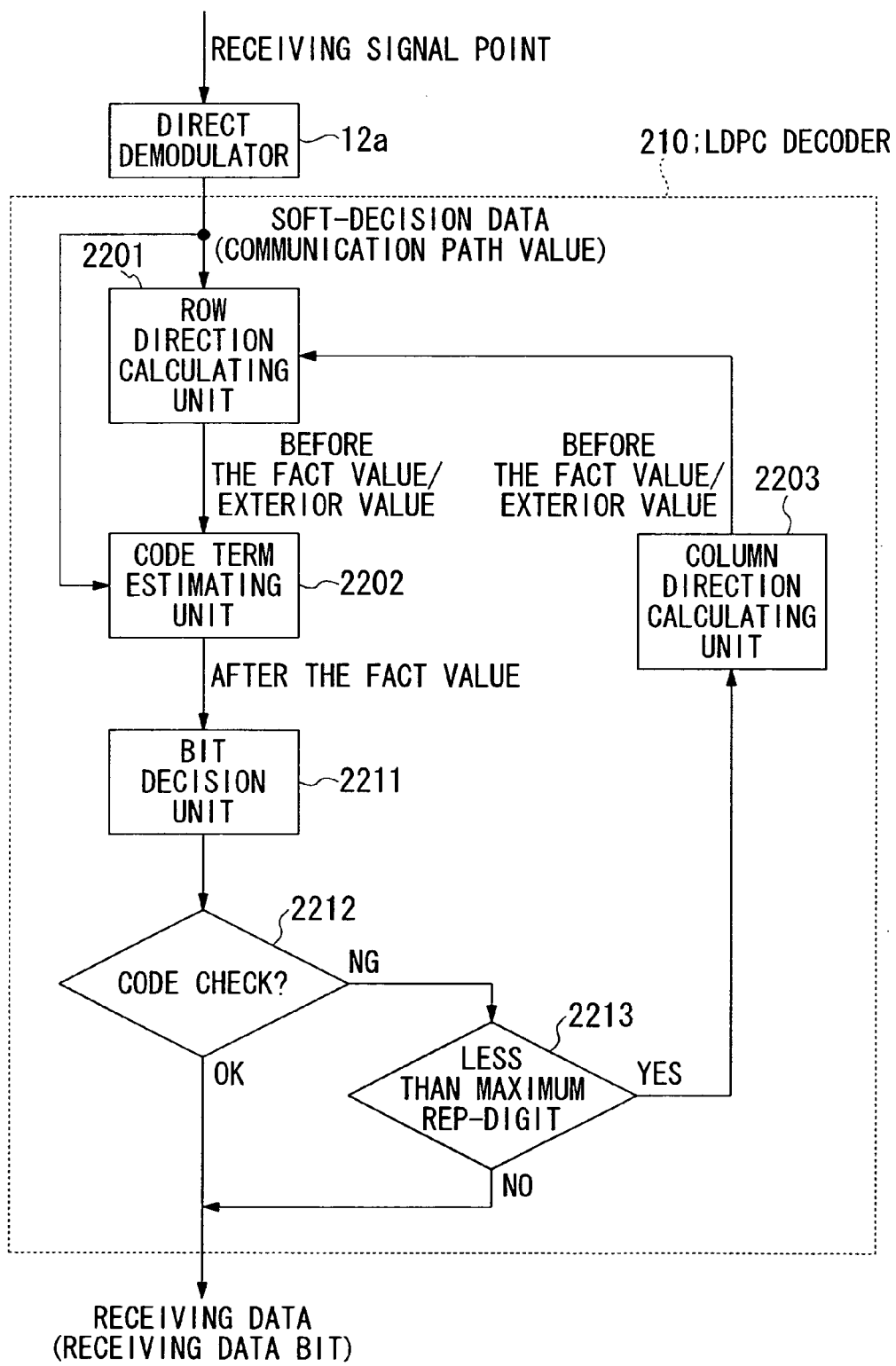
FIG. 7 is a block diagram that illustrates a configuration of an LDPC decoder 210 as a decoder, as illustrated in FIG. 4.

Next, implementation examples applied Low-Density Parity-Check Codes (LDPC codes) are described with a reference to FIG. 7.

FIG. 7 is a block diagram that illustrates a configuration of an LDPC decoder 210 as a decoder, as illustrated in FIG. 4. The configuration of the LDPC decoder 210 in FIG. 7 is well known.

In FIG. 7, the direct demodulator 12a outputs soft-decision data of the modulated symbol per bit as soft-decision data. The soft-decision data is inputted in the LDPC decoder 210 as a communication path value.

The LDPC decoder 210 repeats calculating after-the-fact values, same as the turbo coding, as described above. As its decoding algorithm, Min Sum and Sum Product are typically known. Its repeated calculation is conducted until decoding results become correct code terms or the specified repeating number is reached.

In the LDPC decoder 210, a row direction calculating unit 2201 first conducts row direction calculation to the input communication path values, and outputs before-the-fact values (or exterior values). When the row direction calculation is conducted, exterior values (or before-the-fact values) inputted from a column direction calculating unit 2203 are referred. A code term estimating unit 2202 conducts term estimation according to communication path values after being outputted from a direct demodulator 12a, and before-the-fact values (or exterior values) after being outputted from the row direction calculating unit 2201, and outputs after-the-fact values. The column direction calculating unit 2203 conducts column direction calculation according to results of a decision by a maximum repeating number deciding unit 2213, and outputs exterior values (or before-the-fact values).

A bit decision unit 2211 conducts bit decision according to inputted after-the-fact values. A code checking unit 2212 judges a pass-fail of a code check from the result of the bit decision. In case the code check is passed, the result of the bit decision is outputted as receiving data (receiving information bits). Meanwhile, in case the code check is failed, the maximum repeating number deciding unit 2213 judges whether or not repeating numbers in the LDPC decoder 210 has reached to the maximum repeating number. In case it has reached to the maximum repeating number, the current result of the bit decision is outputted as receiving data (receiving information bits).

Meanwhile, in case it has not reached to the maximum repeating number, the unit gives an instruction of repeating the operation to the LDPC decoder 210.

Third Embodiment

Figure 8:
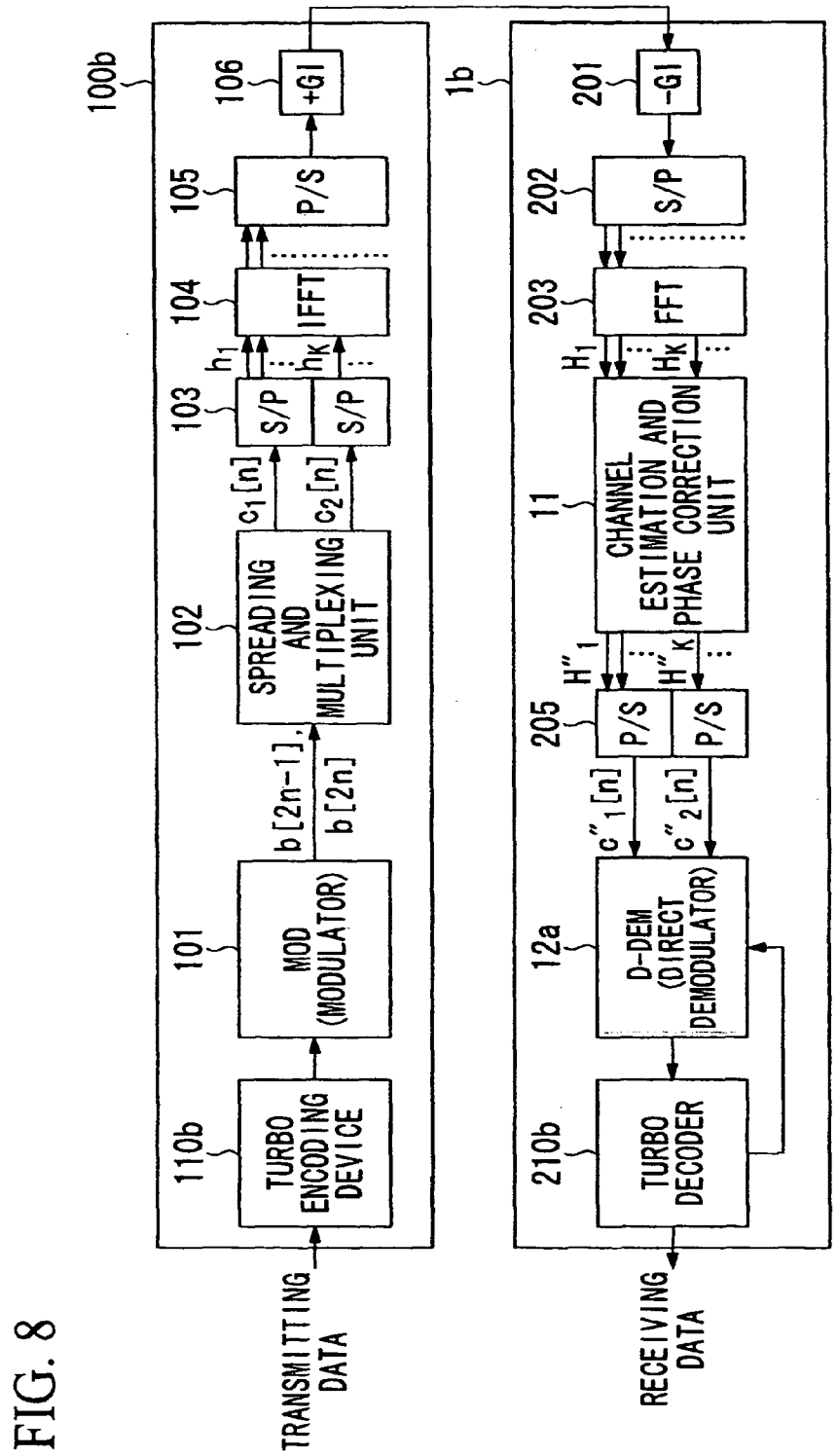
FIG. 8 is a block diagram that illustrates a configuration of a multi-carrier-code-divided multiplexing system according to the third embodiment of the present invention.

FIG. 8 is a block diagram that illustrates a configuration of a multi-carrier-code-divided multiplexing system according to the third embodiment of the present invention. The third embodiment is a deformation example of the above second embodiment, and the above prior probability ratio is calculated in the decoding process with turbo codes applied.

A transmitting device 100b, as illustrated in FIG. 8, includes a turbo encoding device 110b mounted, while another configuration is similar to that of a transmitting device 100, as illustrated in FIG. 13. The transmitting device 100b includes the turbo encoding device 110 b that adds to the transmitting data error correction codes related to the turbo codes. The encoding data is inputted to a modulator 101 from the turbo encoding device 110b. Further processings are similar to those of the transmitting device, as illustrated in FIG. 13.

A receiving device 1b, as illustrated in FIG. 8, includes a turbo decoder 210b mounted. A direct demodulator 12a receives the above prior probability ratio from the turbo decoder 210b, same as the direct demodulator 12a, as illustrated in above FIG. 4.

A decoder 210b conducts decoding processing related to the turbo codes according to the signals demodulated by the direct demodulator 12a, and outputs receiving data. Signals expressing correctness of the decoding result thereof are outputted to the direct modulator 12a as a prior probability ratio. The prior ratios, for example, after-the-fact values, exterior values, which are obtained in a decoding process related to the turbo codes, or values that both the after-the-fact values and exterior values are added are applicable.

Figure 9:
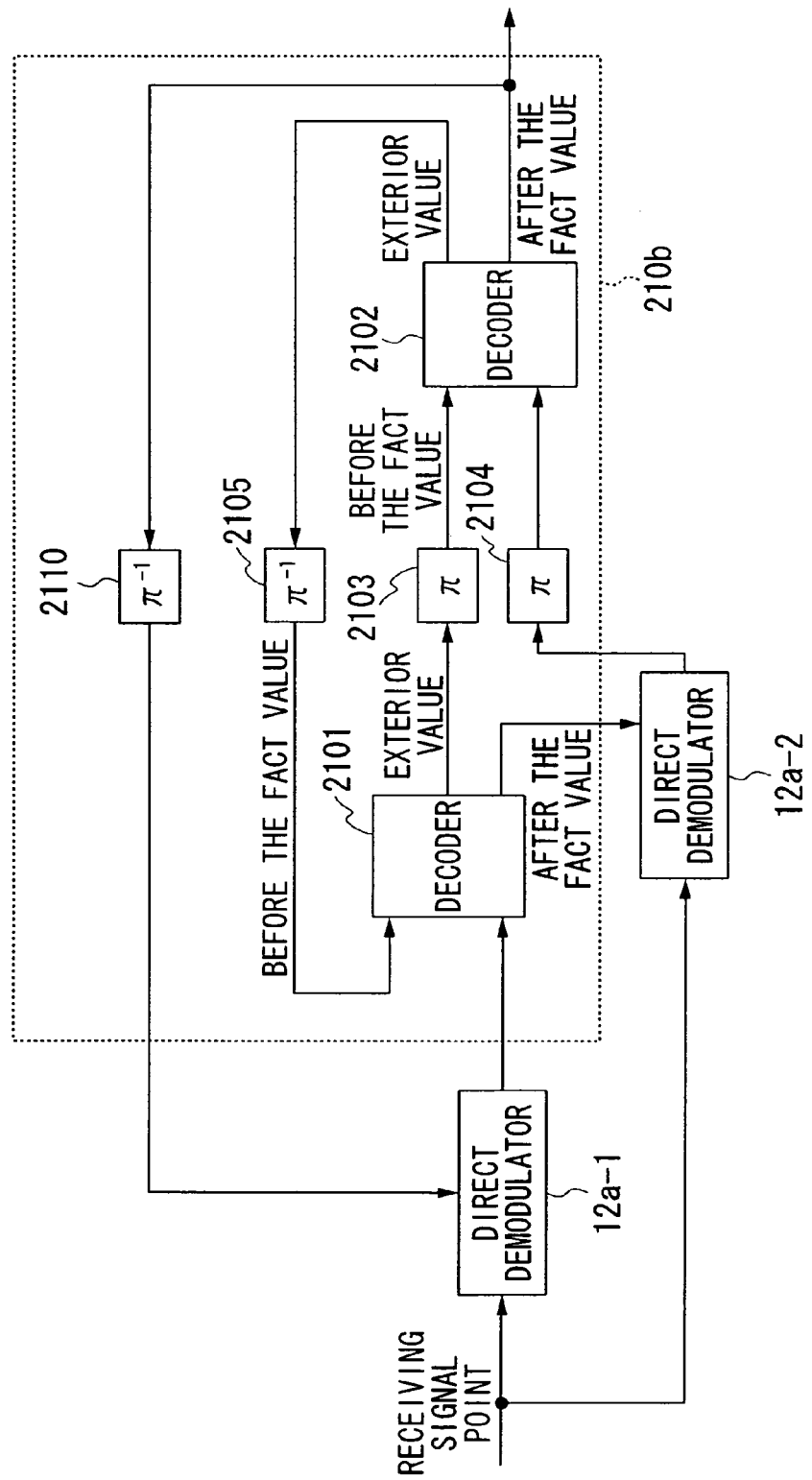
FIG. 9 is a block diagram that illustrates one implementation example of a turbo decoder 210b as a decoder, as illustrated in FIG. 8.

FIG. 9 is a block diagram that illustrates one implementation example of a turbo decoder 210b as a decoder, as illustrated in FIG. 8. FIG. 9 denotes the same codes to each of the units that correspond to those in FIG. 6, and their descriptions are omitted. FIG. 6 shows that two direct demodulators 12a (direct demodulators 12a-1 and 12a-2) are mounted.

FIG. 9 shows the turbo decoder 210b in which the after-the fact value after outputted from the decoder 2102 is inverse-complicated in an inverse interleaver 2110, thereafter, the value is directly inputted to the direct demodulator 12a-1 as a prior probability of a modulated symbol. The soft-decision data (communication path value) used at the time of executing repeated calculation processing from the decoder 2101 are accordingly reflected and updated with the prior probability of the modulated symbol by the direct demodulator 12a-1, and it is expected that accuracy is improved better than that of the soft-decision data (communication path value) in the previous time.

FIG. 9 also shows that the direct demodulator 12a-2 uses the after-the-fact value (prior probability) after outputted from the decoder 2101 and updates communication path values that are inputted to the decoder 2102. The communication path values are updated according to the prior probability rate of each information bit in the update processing.

Therefore, correctness of the transmitting information bits obtained at the decoder 2102 allows the communication path values delivered to the decoder 2102 to be updated, resulting in accuracy improvement of the communication path values inputted to the decoder 2102 available.

According to the turbo decoding processing of the present embodiment, the performance of error correction improves and error transfer can be further prevented.

According to the aforementioned third embodiment, the present invention applied to a system using turbo codes is capable of obtaining prior probability in which a modulated symbol can take a specific value in its decoding process, and contributing to improving demodulating accuracy.

Fourth Embodiment

Figure 10:
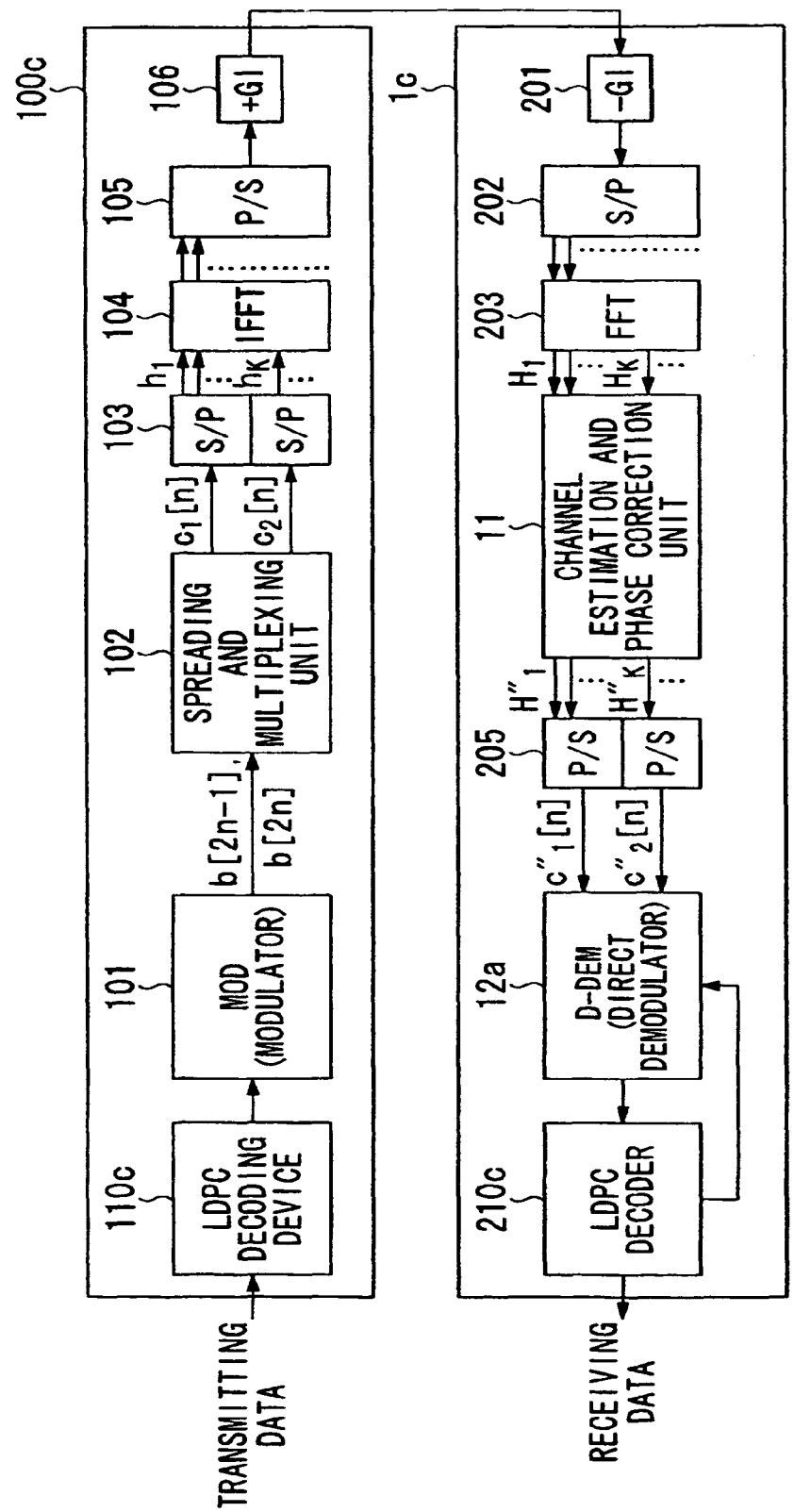
FIG. 10 is a block diagram that illustrates a configuration of a multi-carrier-code-divided multiplexing system according to the fourth embodiment of the present invention.

FIG. 10 is a block diagram that illustrates a configuration of a multi-carrier-code-divided multiplexing system according to the fourth embodiment of the present invention. The fourth embodiment is a deformation example of the above second embodiment, and the above prior probability ratio is calculated in the Low-Density Parity-Check Codes (LDPCs) applied.

A transmitting device 100c, as illustrated in FIG. 10, includes a turbo encoding device 110c mounted while another configuration is similar to that of a transmitting device 100, as illustrated in FIG. 13. The transmitting device 100c includes the LDPC encoding device 110c that adds to the transmitting data error correction codes related to the LDPC codes. Its encoding data is inputted to a modulator 110c from the LDPC encoding device 110c. Further processings are similar to those of the transmitting device, as illustrated in FIG. 13.

A receiving device 1c, as illustrated in FIG. 10, includes an LDPC decoder 210c mounted. A direct demodulator 12a receives the above prior probability ratio from the LDPC 210c, same as the direct demodulator 12a, as illustrated in above FIG. 4.

A decoder 210c conducts decoding processing related to the LDPC codes according to the signals demodulated by the direct demodulator 12a, and outputs receiving data. Signals expressing correctness of the decoding result thereof are outputted to the direct modulator 12a as a prior probability ratio. The prior ratios, for example, after-the-fact values, obtained in a decoding process related to the LDPC codes, are applicable.

Figure 11:
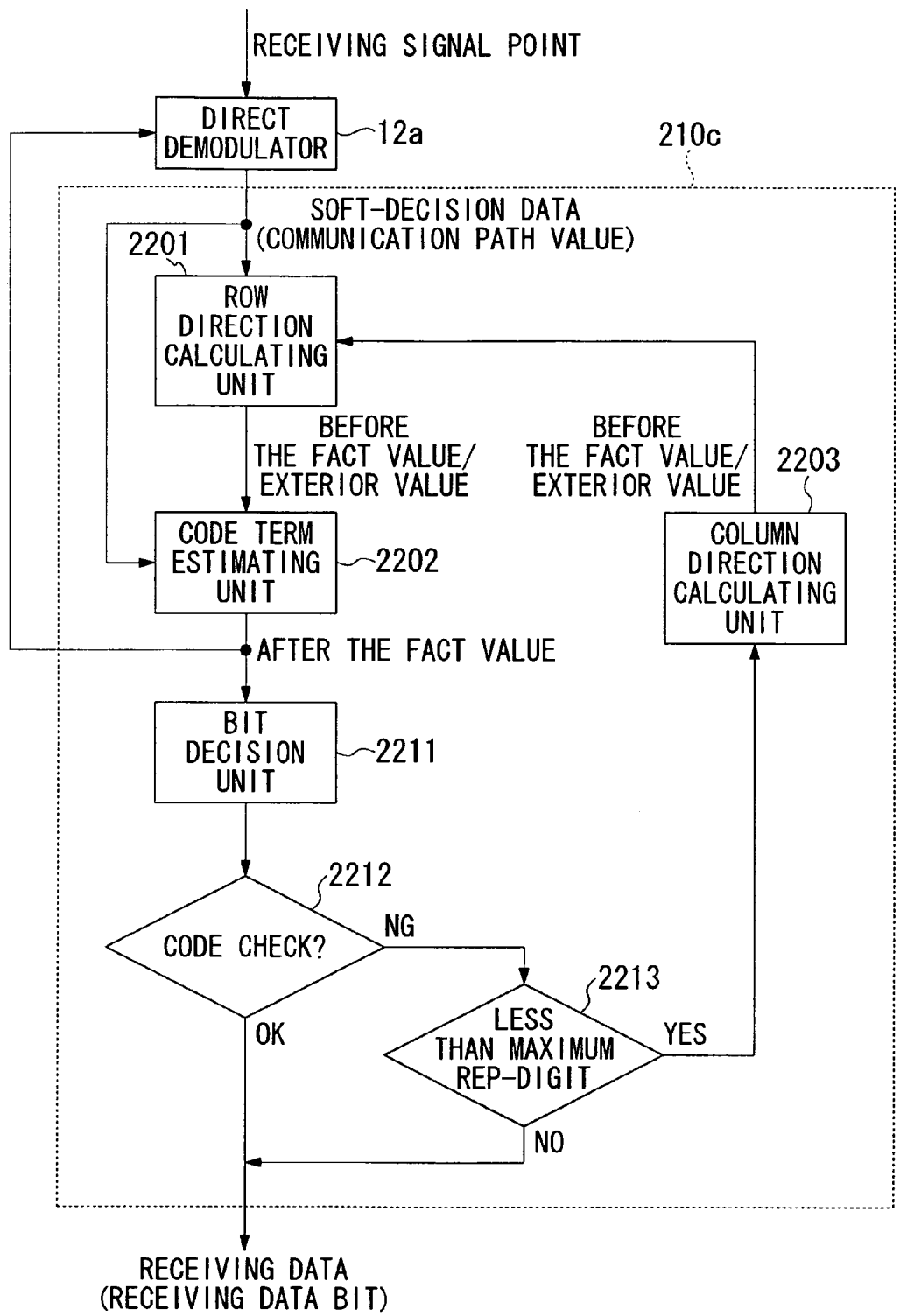
FIG. 11 is a block diagram that illustrates one implementation example of a turbo decoder 210c as a decoder, as illustrated in FIG. 10.

FIG. 11 is a block diagram that illustrates one implementation example of a turbo decoder 210c as a decoder, as illustrated in FIG. 10. FIG. 11 denotes the same codes to each of the units that correspond to those in FIG. 7, and their descriptions are omitted.

FIG. 11 shows that the after-the-fact value after outputted from a code term estimating unit 2202 of an LDPC decoder 210 c is fed back to a direct demodulator 12a as a prior probability. Next, soft-decision data (communication path value) from the direct demodulator 12a are accordingly reflected and updated with the prior probability of the modulated symbol by the direct demodulator 12a, and it is expected that accuracy is improved better than that of the soft-decision data (communication path value) in the previous time. The performance of error correction accordingly improves and error transfer can be further prevented.

According to the aforementioned fourth embodiment, the present invention applied to a system using LDPC codes is capable of obtaining prior probability in which a modulated symbol can take a specific value in its decoding process, and contributing to improving demodulating accuracy.

Although the embodiments of the present invention are described with reference to drawings, specific configurations are not limited to them, but includes design changes made in accordance with the spirit and scope of the present invention.

The aforementioned embodiments, for example, use QPSK system as an example of modulating system, however, the present invention is not limiting this. Other systems, for example, Phase Shift Keying (PSK) system, or Quadrature Amplitude Modulation) system are also applicable.

The present invention is also applicable to arbitral spread ratio, and multiplex numbers.

Furthermore, the present invention is applicable to various spread codes.

It is also applicable even in case of using rotating orthogonal codes as expressed in formula (10). The formula (10) is a spread multiplexing conversion matrix supporting when the spread ratio is $2^N$ and the multiplex numbers are $2^N$.

$$T_{2^N} = \begin{pmatrix} T_{2^{N-1}}\cos(p_N) & T_{2^{N-1}}\sin(p_N) \\ -T_{2^{N-1}}\sin(p_N) & T_{2^{N-1}}\cos(p_N) \end{pmatrix} \quad (10)$$

As specific examples of the above formula (10), the formula (11) shows the spread multiplexing conversion matrix $T_2$, which supports in case the spread ratio is 2 and the multiplex numbers are 2, while the formula (12) shows the spread multiplexing conversion matrix $T_4$, which supports in case the spread ratio is 4 and the multiplex numbers are 4.

$$T_2 = \begin{pmatrix} \cos(p_1) & \sin(p_1) \\ -\sin(p_1) & \cos(p_1) \end{pmatrix} \quad (11)$$

$$T_4 = \begin{pmatrix} T_2\cos(p_2) & T_2\sin(p_2) \\ -T_2\sin(p_2) & T_2\cos(p_2) \end{pmatrix} \quad (12)$$

$$= \begin{pmatrix} \cos(p_1)\cos(p_2) & \sin(p_1)\cos(p_2) & \cos(p_1)\sin(p_2) & \sin(p_1)\sin(p_2) \\ -\sin(p_1)\cos(p_2) & \cos(p_1)\cos(p_2) & -\sin(p_1)\sin(p_2) & \cos(p_1)\sin(p_2) \\ -\cos(p_1)\sin(p_2) & -\sin(p_1)\sin(p_2) & \cos(p_1)\cos(p_2) & \sin(p_1)\cos(p_2) \\ \sin(p_1)\sin(p_2) & -\cos(p_1)\cos(p_2) & -\sin(p_1)\cos(p_2) & \cos(p_1)\cos(p_2) \end{pmatrix}$$

Figure 12:
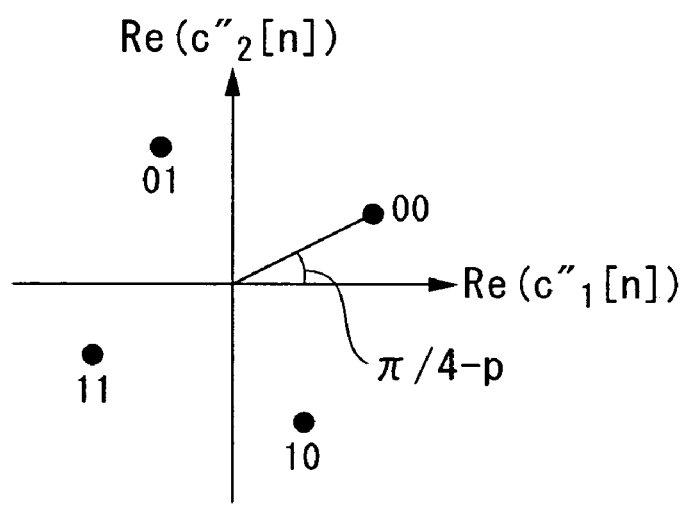
FIG. 12 is a complex space coordinate diagram that illustrates reference signal points of the other embodiment according to the present invention.

An alignment of a reference signal point in case of using the rotating orthogonal codes (spread multiplexing conversion matrix $T_2$), as expressed in the above formula (11), is illustrated in FIG. 12. FIG. 12 illustrates those in examples supporting the above FIG. 2 (1). As FIG. 12 illustrates, the alignment of a reference signal point in case of using rotating orthogonal codes in the above formula (11) is a position rotated from an alignment of the reference signal point in case of FIG. 2 (1) only to an angle of π/4−p (radian). Although FIG. 12 shows an alignment of the real numbers (channel I), it is also the same as in the imaginary numbers.

Introducing parameters equal to the numbers of the spread ratios allows signal points to be decided in more details. For example, the formula (14) is obtained when it is set as the formula (13).

$$T_2(p) = \begin{pmatrix} \cos(p) & \sin(p) \\ -\sin(p) & \cos(p) \end{pmatrix} \quad (13)$$

$$T_4(p_1 \; p_2 \; p_3 \; p_4) = \begin{pmatrix} T_2(p_1)\cos(p_4) & T_2(p_2)\sin(p_4) \\ -T_2(p_3)\sin(p_4) & T_2(p_2 + p_3 - p_1)\cos(p_4) \end{pmatrix} \quad (14)$$

It should be noted that an angle of $P_N$ as an argument of trigonometrical function in the rotating orthogonal codes of the above formula (10) is an adjustment parameter. Diversity effects and inter-code interference can be adjusted by a set value of the adjustment parameter PN, and stabilizing transfer quality can be promoted.

Figure 15:
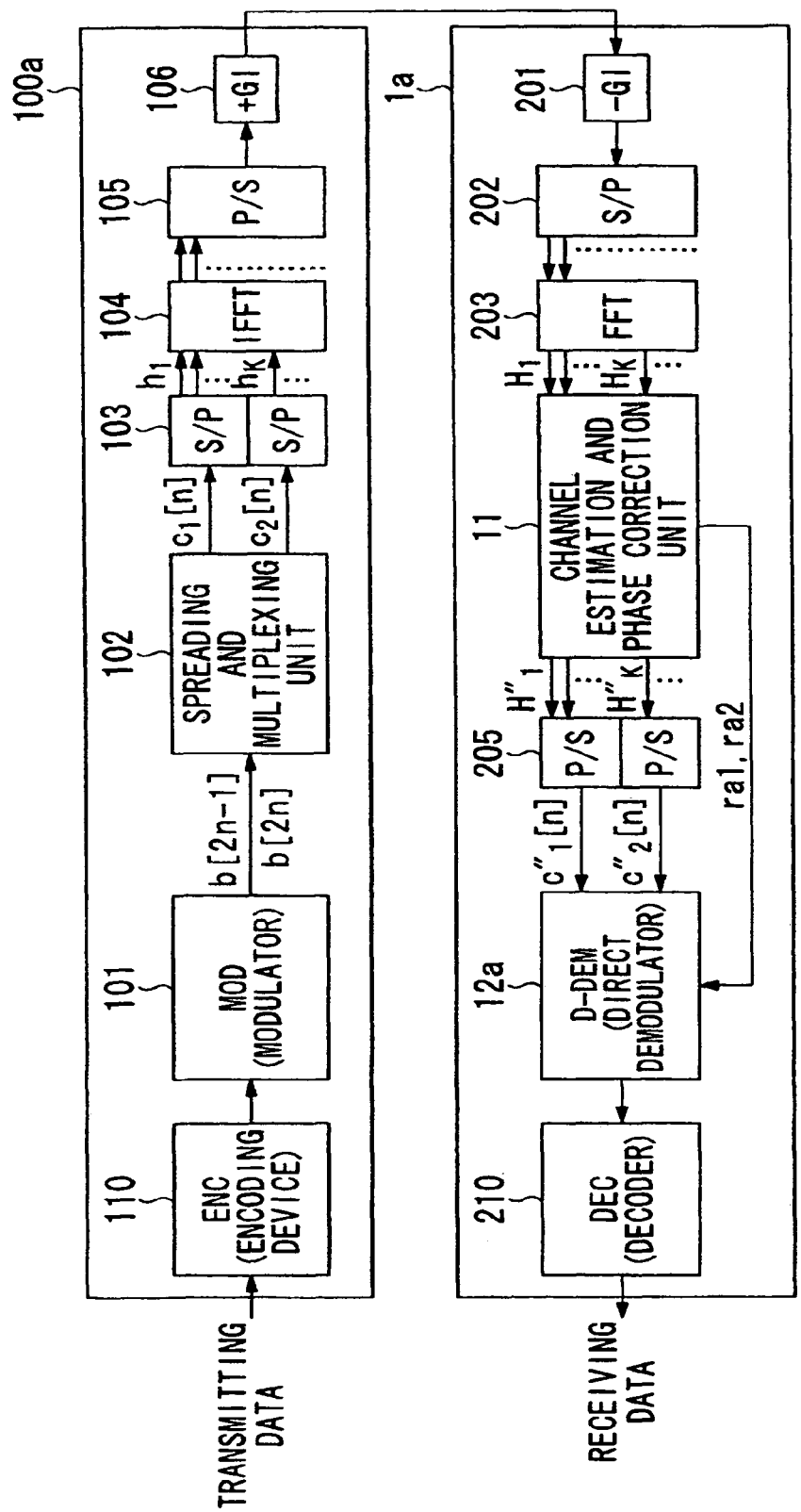
FIG. 15 is a block diagram that illustrates a configuration of a multi-carrier-code-divided multiplexing system for describing one implementation example of a director demodulator 12a according to the embodiment of the present invention.

Next, an implementation example of a direct demodulator according to the embodiment of the present invention is described. The second embodiment as aforementioned in FIG. 4 is described as an example herein. As illustrated in FIG. 15, the present embodiment includes a channel estimation and phase correction unit 11 that detects receiving stress information ra1 and ra2 in the sub-carrier. The receiving stress information ra1 expresses receiving stress of the sub-carrier signal that supports a chip signal c1 [n]. The receiving stress information ra2 expresses receiving stress of the sub-carrier signal that supports a chip signal c2 [n]. The receiving stress information ra1 and ra2 are inputted to a direct demodulator 12a. As receiving stress information, for example, receiving power of the sub-carrier signal, or a value expressing receiving amplification can be used.

Figure 16:
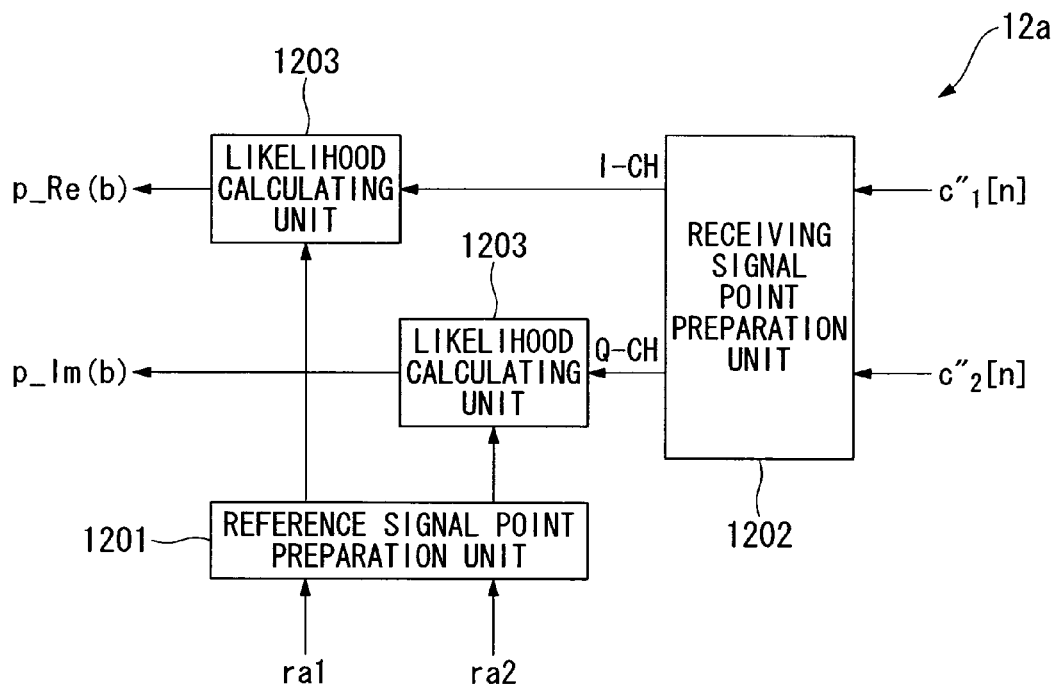
FIG. 16 is a block diagram that illustrates a configuration of a direct demodulator 12a according to the embodiment of the present invention.

FIG. 16 is a block diagram that illustrates a configuration example of a direct demodulator 12a. In FIG. 16, the direct demodulator 12a has a reference signal point preparation unit 1201, a receiving signal point preparation unit 1202, and two likelihood calculation units 1203. The likelihood calculation units 1203 are separately mounted as the unit for calculating the real numbers p_Re (b) of the likelihood, and the unit for calculating the imaginary numbers p_Im (b) of the likelihood.

Figure 17:
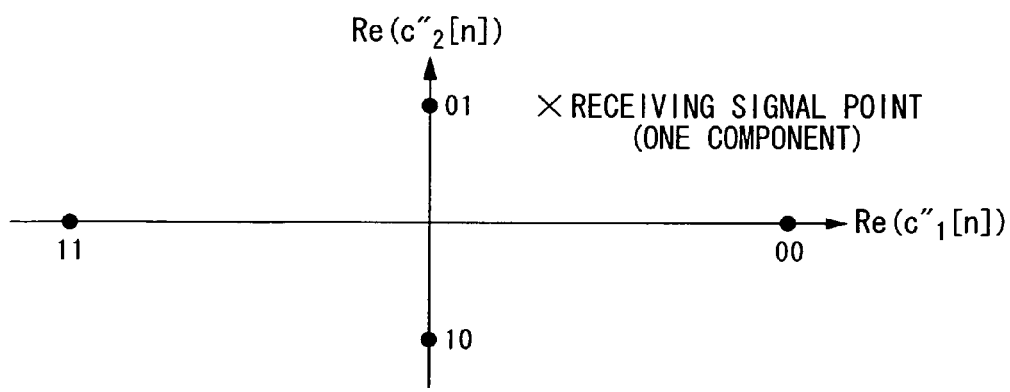
FIG. 17 shows examples of a reference signal point and a receiving signal point prepared by the direct demodulator 12, as illustrated in FIG. 16.

The reference signal point preparation unit 1201 prepares coordinates of the reference signals according to the type of modulating system, type of spread multiplexing system and receiving stress information ra1 and ra2. The coordinates of the reference signal points are separately prepared for the real numbers (channel I component) and for the imaginary numbers (channel Q component). FIG. 17 illustrates an example of a reference signal point prepared by the reference signal point preparation unit 1201. An example in FIG. 17 shows a reference signal point prepared using QPSK system as a modulation system and dual multiplex of duple spread with Walsh codes, indicating "00", "01", and "11" of the reference signal points for the real numbers. The reference signal point preparation unit 1201 calculates the coordinates of "00" and "11" components (in horizontal axis in FIG. 17) supporting the chip c1 [n], and the coordinates of "01", and "10" components (in vertical axis in FIG. 17) supporting the chip c2 [n] according to the receiving stress information ra1, and ra2. A size of the coordinate in the reference signal point component is proportionated to a size of the receiving stress. An example in FIG. 17 shows that the receiving stress indicated by the receiving stress information ra1 is larger than that indicated by the receiving stress information ra2. The coordinates of "00" and "11" components supporting the chip signal c1 [n] are larger than those of "01" and "10" components supporting the chip signal c2 [n].

The receiving signal point preparation unit 1202 prepares coordinates of the receiving signal points from the combination of chip signals (c1" [n] and c2" [n]). The receiving signal points are separately prepared as the real numbers (channel I component) and as the imaginary numbers (channel Q component). Coordinates of the receiving signal points are adjusted to the coordinates system of the reference signal points. The real numbers of the receiving signal points are combinations of c1" [n] in the real numbers and c2" [n] in the real numbers. The imaginary numbers of the receiving signal points are combinations of c1" [n] in the imaginary numbers and c2" [n] in the imaginary numbers. FIG. 17 shows an example of the receiving signal point in the real numbers (as marked with x in FIG. 17).

Coordinates of the reference signal points for the real numbers are inputted to the likelihood calculation unit 1203 for calculating the real numbers p_Re (b) in the likelihood p from the reference signal preparation unit 1201, and coordinates of the receiving signal points in real numbers are inputted from the receiving signal points preparation unit 1202. Coordinates of the reference signal points for the imaginary numbers are inputted to the likelihood calculation unit 1203 for calculating the imaginary numbers p_Im (b) in the likelihood p from the reference signal preparation unit 1201, and coordinates of the receiving signal points in imaginary numbers are inputted from the receiving signal points preparation unit 1202. The likelihood calculation unit 1203 calculates the square of a distance between the coordinates of the reference signal points and the coordinates of the receiving signal points, and computes likelihood (the real numbers p_Re (b) or the imaginary numbers p_Im (b)) from the square distance according to the above formula (9). The likelihood p as the result of computation (the real numbers p_Re (b) and the imaginary numbers p_Im (b)) is inputted to the decoder 210.

INDUSTRIAL APPLICABILITY

Since the present invention can be applied to a multi-carrier code dividing multiplex transfer system that obtains frequency diversity effects by means of using orthogonal codes and frequency-multiplexing with a plurality of the sub-carriers the signals spread in frequency direction, and demodulation can be provided as in a spread state without inverse spread, the demodulation can be promoted without any affects of inter-code interference. As a result, demodulating accuracy can be improved and receiving characteristics can also be improved.

The invention claimed is:

1. A multi-carrier code dividing multiplex transfer system for code-spreading modulated symbols in a frequency direction, frequency-multiplexing and transferring them in a plurality of sub-carriers, comprising:
a demodulator for discriminating transmitted signals according to a receiving signal point composed of combination of receiving values in a spread state of the sub-carriers in a range where one modulated symbol is spread, and according to a reference signal composing values capable of being taken by the combination of the receiving values in the spread state.

2. The multi-carrier code dividing multiplex transfer system according to claim 1, wherein the demodulator discriminates the transmitted signals according also to a probability that the modulated symbols take specific values.

3. The multi-carrier code dividing multiplex transfer system according to claim 2, further comprising:
a decoder for applying error correction codes, decoding the error correction codes from the result of a discrimination from the demodulator, and giving feedback correctness of decoding result obtained in the decoding operation as the probability.

4. The multi-carrier code dividing multiplex transfer system according to claim 1, wherein rotating orthogonal codes composed of a trigonometrical function including adjustment parameters as arguments are used as spread codes.

5. The multi-carrier code dividing multiplex transfer system according to claim 1, wherein the demodulator comprising:
a reference signal point preparation unit for preparing a coordinate of reference signals according to a type of modulating method, a type of spread multiplexing method and information on receiving stress of the sub-carrier signals;
a receiving signal point preparation unit for preparing a coordinate of the receiving signal from the combination of the receiving values in the spread state; and
a likelihood calculation unit for calculating the likelihood according to the coordinate of the reference signal point and the coordinate of the receiving signal point.

6. The multi-carrier code dividing multiplex transfer system according to claim 5, wherein the coordinate of the reference signal point, the coordinate of the receiving signal point and the likelihood are separated into real numbers and imaginary numbers, which are respectively calculated.

7. A method for utilizing the multi-carrier code dividing multiplex transfer system of claim 1 to code-spread modulated symbols in a frequency direction, and frequency-multiplex and transfer them, comprising the step of demodulating for discriminating transmitted signals according to a receiving signal point composed of combination of receiving values in a spread state of sub-carriers in a range where one modulated symbol is spread, and according to a reference signal point capable of being taken by the combination of receiving values in the spread state.

8. The method according to claim 7, wherein the step of demodulating further includes the steps of:
preparing a coordinate of reference signals according to a type of modulating method, a type of spread multiplexing method and information on receiving stress of the sub-carrier signals;
preparing a coordinate of the receiving signal from the combination of the receiving values in the spread state; and
calculating the likelihood according to the coordinate of the reference signal point and the coordinate of the receiving signal point.

9. The method according to claim 8, comprising the step of respectively calculating the coordinate of the reference signal point, the coordinate of the receiving signal point and the likelihood with separating into real numbers and imaginary numbers.

10. A receiving device for receiving transferred signals with modulated symbols code-spread and frequency-multiplexed by a plurality of sub-carriers modulated symbols in a frequency direction, comprising:
a demodulator for discriminating transmitted signals according to a receiving signal point composed of combination of receiving values in a spread state of sub-carriers in a range where one modulated symbol is spread, and according to a reference signal composing values capable of being taken by the combination of the receiving values in the spread state.

11. The receiving unit according to claim 10, wherein the demodulator including:
a reference signal point preparation unit for preparing a coordinate of reference signals according to a type of modulating method, a type of spread multiplexing method and information on receiving stress of the sub-carrier signals;
a receiving signal point preparation unit for preparing a coordinate of the receiving signal from the combination of the receiving values in the spread state; and
a likelihood calculation unit for calculating the likelihood according to the coordinate of the reference signal point and the coordinate of the receiving signal point.

12. The receiving unit according to claim 11, wherein the coordinate of the reference signal point, the coordinate of the receiving signal point and the likelihood are separated into real numbers and imaginary numbers which are respectively calculated.

* * * * *